(12) United States Patent
Kikuchi et al.

(10) Patent No.: US 7,747,128 B2
(45) Date of Patent: Jun. 29, 2010

(54) WAVEGUIDE DEVICE

(75) Inventors: Takashi Kikuchi, Ebina (JP); Roshan Thapliya, Ebina (JP); Shigetoshi Nakamura, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/054,620

(22) Filed: Mar. 25, 2008

(65) Prior Publication Data

US 2009/0060434 A1 Mar. 5, 2009

(30) Foreign Application Priority Data

Sep. 3, 2007 (JP) .............................. 2007-228197

(51) Int. Cl.
*G02B 6/00* (2006.01)

(52) U.S. Cl. ................... 385/141; 385/129; 436/164

(58) Field of Classification Search ................ 385/141, 385/37, 144–145, 129–132; 436/164; 359/15, 359/17, 18, 558, 566, 573; 369/103
See application file for complete search history.

(56) References Cited

U.S. PATENT DOCUMENTS

| | | | |
|---|---|---|---|
| 6,429,023 B1 * | 8/2002 | Gharavi | 436/167 |
| 6,906,842 B2 * | 6/2005 | Agrawal et al. | 359/265 |
| 2003/0207215 A1 * | 11/2003 | Xu et al. | 430/321 |
| 2004/0178523 A1 * | 9/2004 | Kim et al. | 264/1.27 |
| 2007/0259441 A1 * | 11/2007 | Saaski | 436/164 |
| 2008/0118217 A1 * | 5/2008 | Bintz et al. | 385/143 |
| 2008/0149957 A1 * | 6/2008 | Kameshima et al. | 257/98 |
| 2008/0195088 A1 * | 8/2008 | Farr et al. | 606/15 |
| 2008/0212914 A1 * | 9/2008 | Marks et al. | 385/2 |
| 2008/0240652 A1 * | 10/2008 | Todori et al. | 385/27 |

FOREIGN PATENT DOCUMENTS

| | | | |
|---|---|---|---|
| JP | 08-87040 A | | 4/1996 |
| JP | 2003-202533 A | | 7/2003 |
| JP | 2006147906 | * | 6/2006 |

OTHER PUBLICATIONS

"Second-Order Nonlinear-Optical Processes in Orientationally Ordered Materials: Relationship Between Molecular and Macroscopic Properties.", Kenneth D. Singer, et al.; *Journal of the Optical Society of America B, Optical Physics;* vol. 4, No. 6, Jun. 1987.

* cited by examiner

*Primary Examiner*—Ellen Kim
(74) *Attorney, Agent, or Firm*—Sughrue Mion, PLLC (57) ABSTRACT

A waveguide device includes a substrate and a first electrode, a first cladding layer, a waveguide, a second cladding layer, and a second electrode sequentially provided on the substrate. At least one of the first cladding layer, the waveguide, and second cladding layer includes a ligand compound which is capable of coordinating to a metal or metal ion.

10 Claims, 7 Drawing Sheets

WAVEGUIDE DEVICE

CROSS-REFERENCE TO RELATED APPLICATION

This application is based on and claims priority under 35 USC 119 from Japanese patent Application No. 2007-228197 filed on Sep. 3, 2007.

BACKGROUND

1. Technical Field

The present invention relates to a waveguide device.

2. Related Art

The information society has been remarkably developing. In recent years, large-capacity information such as moving images are frequently exchanged between individuals as well as between companies, so that communication tools with a larger capacity and a higher speed have been demanded. Therefore, the importance of optical communications capable of large-capacity, high-speed information communication has been increasingly growing.

The large-capacity, high-speed communications are supported by optical communication techniques. Examples of devices used for optical communications include optical fibers and various waveguide devices such as optical switching elements, optical modulators, and routers. These devices are integrated to fabricate optical circuits having various functions. In particular, optical elements such as optical switching elements and optical modulators often include organic electro-optic materials (non-linear optical materials) having "electro-optic effect (EO effect)" to change the refractive index with the electric field. Specifically, organic electro-optic materials have a low dielectric constant, so that there is no velocity mismatch between optical wave and microwave or millimeter wave. Therefore, their possibility of remarkably improving the response speed has been receiving attention. In addition, an organic electro-optic materials can be dispersed in or combined with polymer materials, and thus can be applied by spin coating or other method to readily form large thin films with improved processability, so that they have a great advantage in fabrication of devices at remarkably low cost.

SUMMARY

According to an aspect of the invention, there is provided a waveguide device including a substrate and a first electrode, a first cladding layer, a waveguide, a second cladding layer, and a second electrode sequentially provided on the substrate. At least one of the first cladding layer, the waveguide, and the second cladding layer includes a ligand compound which is capable of coordinating to a metal or metal ion.

BRIEF DESCRIPTION OF THE DRAWINGS

Exemplary embodiments of the present invention will be described in detail based on the following figures, wherein.

DETAILED DESCRIPTION

Regarding a waveguide device using a crystal of an inorganic ferroelectric crystal such as lithium niobate ($LiNbO_3$, hereinafter abbreviated as "LN"), it is known that the operating point of the driving signal shifts depending on temperature or with time (the phenomenon is referred to as drift phenomenon). Regarding a waveguide device using the EO effect of an organic electro-optic material (non-linear optical material), the drift phenomenon was also observed when operating an organic EO waveguide device over long period. The drift phenomenon determines the lifetime of the waveguide devices, and therefore, the suppression of the drift phenomenon is necessary to realize practical devices.

An exemplary embodiment of the invention is illustrated below with reference to the following drawings. Members having substantially the same function and effect are denoted by the same reference numerals throughout all the drawings, and repetitive description thereof may be omitted.

Figure 1:
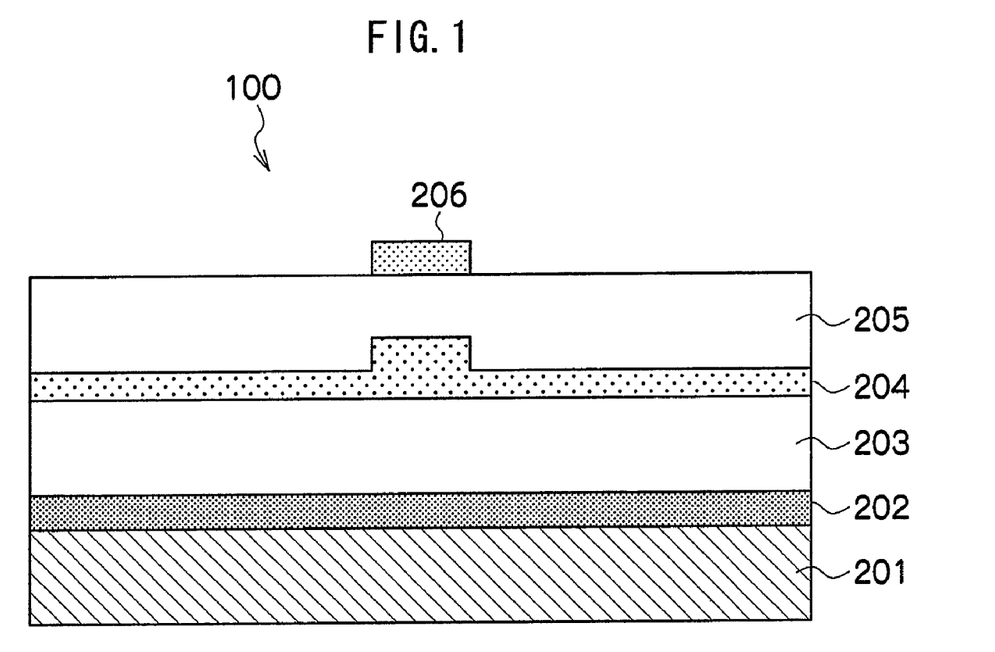
FIG. 1 is a cross sectional view showing the waveguide device according to an exemplary embodiment of the present invention.

FIG. 1 is a schematic cross sectional view showing the waveguide device according to an exemplary embodiment.

A waveguide device 100 according to the exemplary embodiment is composed of stacked layers as shown in FIG. 1, wherein a lower electrode 202 (first electrode), a lower cladding layer 203 (first cladding layer), a waveguide 204, an upper cladding layer 205 (second cladding layer), and an upper electrode 206 (second electrode) are sequentially stacked on a substrate 201.

The waveguide device 100 is described below in detail together with its fabrication process. The fabrication process described below is an example, and may be modified according to the device structure or the materials used therein.

FIGS. 2A to 2F sequentially show the steps for fabricating the waveguide device, wherein the lower electrode 202, lower cladding layer 203, waveguide 204, upper cladding layer 205, and upper electrode 206 are formed on the substrate 201.

[Substrate]

In the first place, a substrate 201 is provided. The substrate is not particularly limited, and may have excellent smoothness. Examples of the substrate include a metal substrate, a silicon substrate, and a transparent substrate. The substrate may be appropriately selected according to the form of the waveguide optical modulation device. Examples of the metal substrate include gold, silver, copper, aluminum, and silicon substrates, and examples of the transparent substrate include quartz, glass, and plastic substrates.

[Lower Electrode]

Figure 2A:
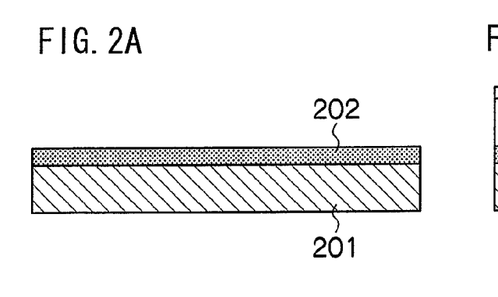
FIGS. 2A to 2F are flow sheets showing a fabrication process for a waveguide device according to an exemplary embodiment of the invention.

Subsequently, as shown in FIG. 2A, a lower electrode 202 (electric wiring) is formed on the substrate 201. The lower electrode 202 may be, for example, a vapor-deposited metal layer, or a transparent electrode layer. Examples of the vapor-deposited metal include gold, silver, copper, and aluminum.

Examples of the transparent electrode layer include indium tin oxide (ITO), fluorine-doped tin oxide (FTO), and antimony-doped tin oxide.

[Lower Cladding Layer]

Figure 2B:
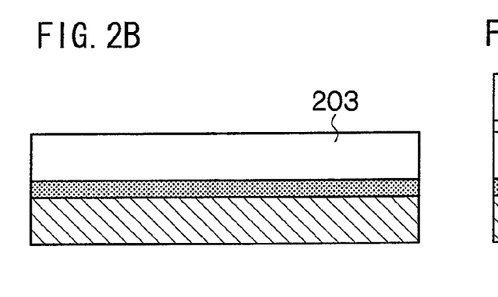

Subsequently, as shown in FIG. 2B, a lower cladding layer 203 is formed on the lower electrode 202. The lower cladding layer 203 may include, for example, polyimide, fluorinated polyimide, or a photocurable acrylic or epoxy resin. The material may be applied by a well-known method such as spin coating, dip coating, spray coating, or print coating. Among them, spin coating is particularly convenient.

[Waveguide]

Figure 2C:
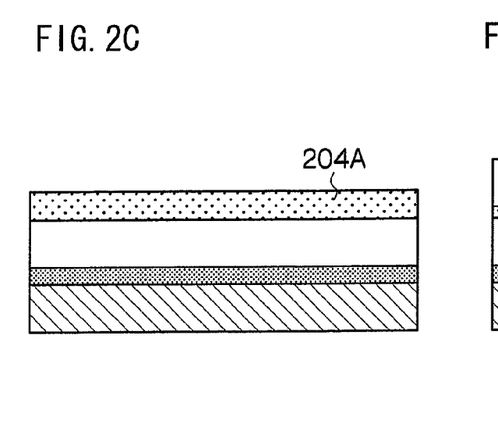

Subsequently, as shown in FIG. 2C, a waveguide layer 204A is formed on the lower cladding layer 203. The waveguide layer 204A is formed by applying the component, which has been melted by heat or dissolved in an organic solvent, onto the lower cladding layer 203. The application method may be a well-known method such as spin coating, dip coating, spray coating, or print coating. Among them, spin coating is particularly convenient.

Figure 2D:
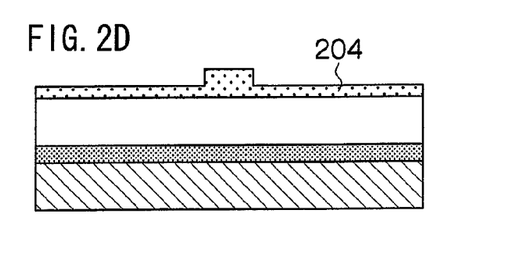
Figure 6:
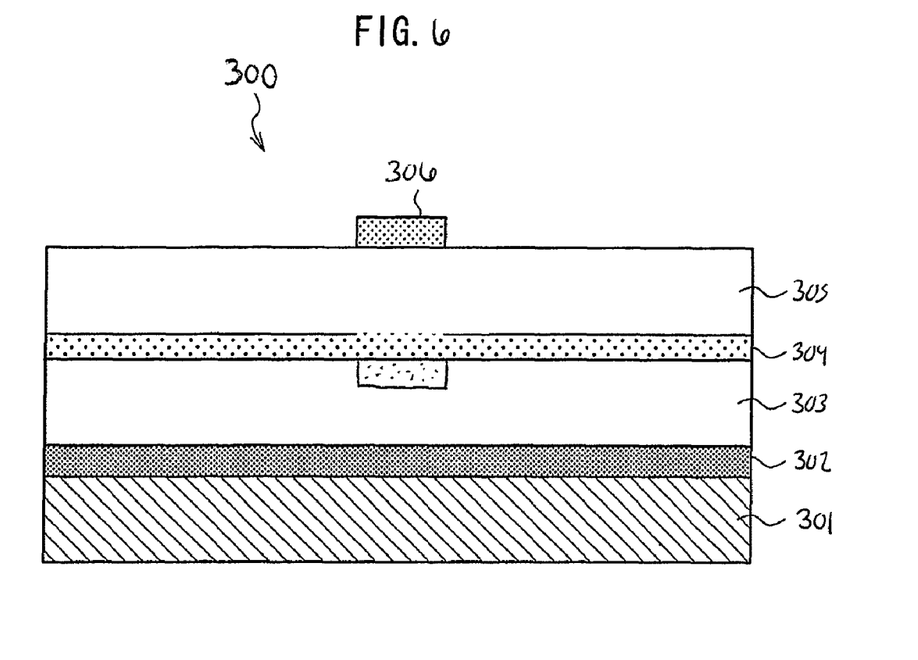
FIG. 6 is a cross sectional view showing the waveguide device with an inversed ridge waveguide according to an exemplary embodiment of the present invention.
Figure 7:
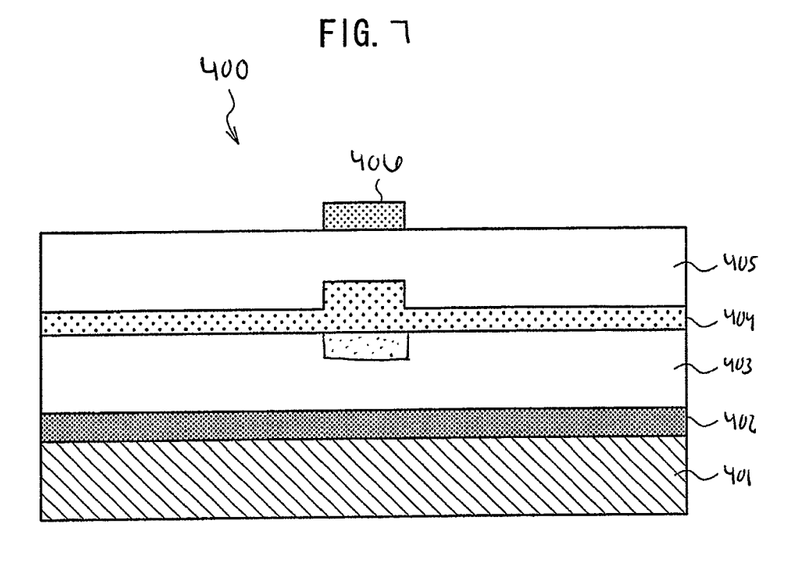
FIG. 7 is a cross sectional view showing the waveguide device with an twin ridge waveguide according to an exemplary embodiment of the present invention.

Subsequently, as shown in FIG. 2D, after the waveguide layer 204A is formed, the waveguide layer 204A is patterned by a known method using a semiconductor processing technique such as reactive ion etching (RIE), photolithography, or electron beam lithography thereby forming a ridge waveguide 204. The waveguide 204 may be formed by partially irradiating the waveguide layer 204A with patterned UV light or electron beams to change the refractive index of the irradiated areas. In the present exemplary embodiment, the waveguide 204 has a ridge structure. The structure of the waveguide 204 is not limited to ridge, and may be, for example, an inversed ridge, or a twin ridge waveguide (waveguide having projections on both sides in the thickness direction), as shown in FIGS. 6 and 7, respectively.

The waveguide 204 is a well-known waveguide described in Koha Kogaku (published by Corona Publishing Co., Ltd., 1988), Chapter 107, p. 204, for example, a branched waveguide, a Mach-Zehnder waveguide, a directional coupler waveguide, or a crossed waveguide.

The organic electro-optic material for waveguide is selected from materials of a higher refractive index than the lower cladding layer 203 and upper cladding layer 205. Examples of the organic electro-optic material include a material containing a low molecular weight compound having an EO effect dispersed in a polymer, and a low molecular weight compound having an EO effect in a side chain or the main chain of a polymer. Examples of the polymer include polyimide, fluorinated polyimide, polycarbonate, polysulfone, polyacrylate, polymethacrylate, polyether imide, and polyether sulfone. Specifically, fluorinated polyimide is preferable due to less propagation loss of light. According to Chemical Reviews, Vol. 94, No. 1, p. 31 (1994), in cases where a non-linear optical material is dispersed in a polymer and used to make a waveguide, the polymer is preferably selected from polymers of a glass transition point of 200° C. or higher from the viewpoint of the long-term reliability of the device.

Specific examples of the low molecular weight compound with an EO effect include azo dyes and melocyanine dyes having an electron-donating group and an electron-withdrawing group. Among them, preferable examples include Disperse Red (DR 1), 2-methyl-6-(4-N,N-dimethylaminobenzylidene)-4H-pyran-4-ylidenepropanedinitrile, 4-{[4-(dimethylamino)phenyl]imino}-2,5-cyclohexadiene-1-one.

[Upper Cladding Layer]

Figure 2E:
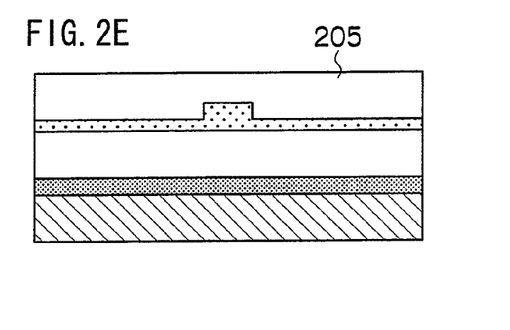

Subsequently, as shown in FIG. 2E, an upper cladding layer 205 is formed on the waveguide 204. The upper cladding layer 205 formed on the waveguide 204 may be composed of any material as long as it has a lower refractive index than the waveguide 204. Specific examples of the material of the upper cladding layer 205 include polyimide, fluorinated polyimide, and a photocurable acrylic or epoxy resin. The application method for the material may be a well-known method such as spin coating, dip coating, spray coating, or print coating. Among them, spin coating is particularly convenient.

At least one of the first cladding layer, the waveguide, and the second cladding layer includes a ligand compound. Examples of the ligand compound capable of coordinating to a metal or metal ion include compounds containing an oxygen, nitrogen, sulfur, or phosphorus atom having a lone pair. The ligand compound may be a monomer, or a polymer compound having in the main chain or a side chain thereof a ligand compound structure. Specific examples of the ligand compound include: monodentate ligand compounds such as pyridine, triphenyl phosphine, and triethylamine; bidentate ligand compounds such as ethylenediamine, bipyridine, phenanthroline, and BINAP (2,2'-bis(diphenylphosphino)-1,1'-binaphthyl); and tridentate or higher-dentate ligand compounds such as terpyridine, ethylenediamine tetraacetate, porphyrin, crown ether, cyclodextrin, and calixarene (cyclophane). Among them, bidentate or higher-dentate ligand compounds are preferable for suppressing drift phenomenon because they have a large association constant for a metal or metal ion.

The ligand compound is preferably an inclusion compound such as a crown ether, cryptand, cyclodextrin, or calixarene (cyclophane), and is more preferably a compound having a polyether structure from the viewpoint of suppressing drift phenomenon. Thus typical examples of the inclusion compound having a cyclic polyether structure include a crown ether such as 12-crown-4, 15-crown-5, or 18-crown-6.

An inclusion compound is a compound produced by a combination of a compound having within the molecule thereof a one- to three-dimensional molecular-scale space, and another compatible compound trapped and contained in the space. In the present description, however, the term "inclusion compound" refers to a host compound which has a space within the molecule thereof, and is capable of forming an inclusion compound.

At least one of the first cladding layer, the waveguide, and the second cladding layer includes the ligand compound(s) in a total amount of from 0.001% by weight to about 10% by weight, and more preferably from about 0.01% by weight to about 3% by weight, with respect to the total solid content.

[Upper Electrode]

Figure 2F:
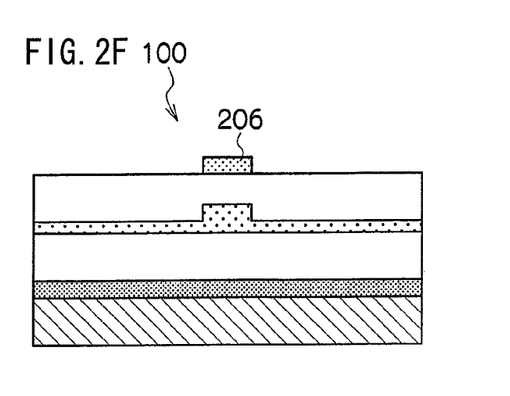
Figure 3A:
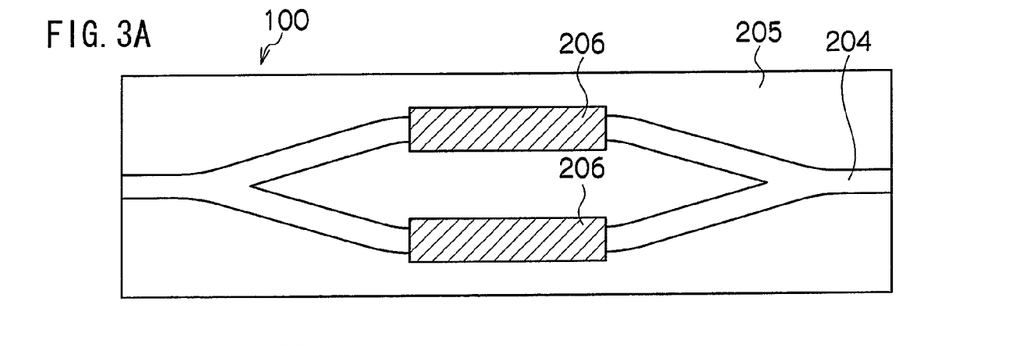
FIGS. 3A to 3D are plan views showing examples of the form of a waveguide device according to an exemplary embodiment of the invention.
Figure 3B:
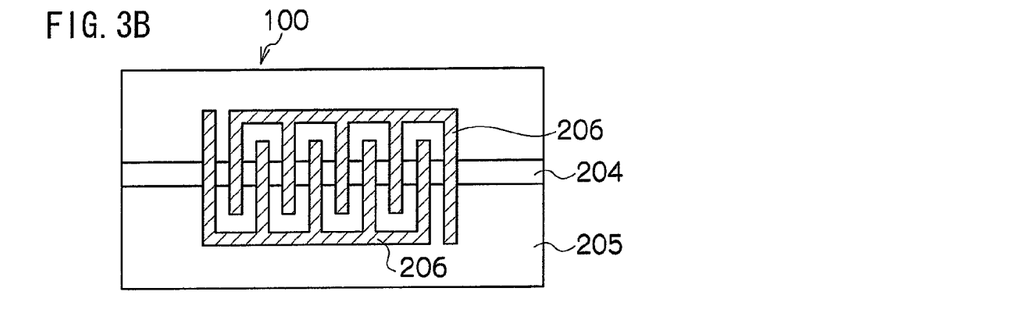
Figure 3C:
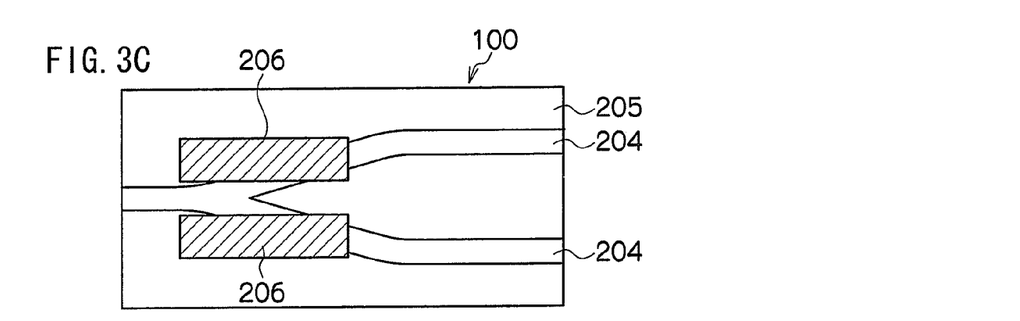
Figure 3D:
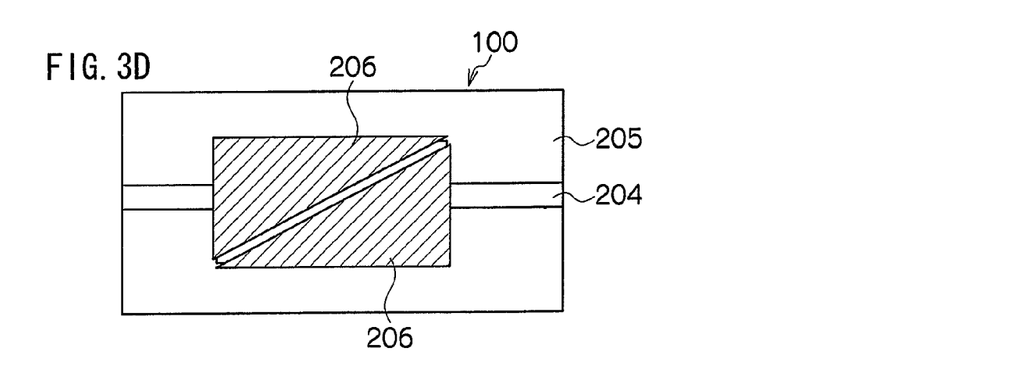

Subsequently, as shown in FIG. 2F, an upper electrode 206 (electric wiring) is formed as necessary on all over or part of the upper cladding layer 205. As with the lower electrode, the upper electrode is not particularly limited as to its material. For example, the material may be a metal such as gold, silver, copper, or aluminum. The upper electrode may be an electrode formed by vapor deposition of the material.

Although not described in the above-described process, the waveguide device 100 is poled so that the waveguide device expresses a non-linear optical effect. The poling may be carried out by applying a direct current field to a softened or fluidized sample equipped with electrodes, or an electrification charge generated by corona discharge. The sample may be solidified by cooling or thermosetting the polymer. In either case, the sample may be solidified under application of an electric field or electrification. The process may be carried out at any time after the formation of the waveguide. However, the non-linear optical effect deteriorates if heating is necessary in the subsequent process, so that the poling may be carried out as the final process.

The form of the waveguide device 100 fabricated as described above is then subjected to dicing or cleavage thereby cutting chips from the wafer, and thus a finished device is obtained.

The waveguide device according to the present exemplary embodiment is not particularly limited as to its form, and examples of the form include those shown in FIGS. 3A to 3D. FIGS. 3A to 3D are plan views of waveguide devices seen from above. The same components with FIG. 1 are denoted by the same reference numerals. The waveguides located inside are visually represented in the figures. FIGS. 3A through 3D show a Mach-Zehnder waveguide device, a TE-TM mode converter, a branched (switch) waveguide device, and a Multi-Mode Interferometer waveguide device, respectively.

In the waveguide device 100 according to the above exemplary embodiment, at least one of the first cladding layer, the waveguide 204, and the second cladding layer includes a ligand compound capable of binding to a metal or metal ion.

EXAMPLES

The present invention is further illustrated by the following examples, however the invention is not limited to the following examples.

Example 1

A solution composed of 83 parts by weight of cyclohexanone, 14 parts by weight of polysulfone, and 3 parts by weight of [3-cyano-2-dicyanomethylidene-4-{trans,trans-[3-(2-(4-N,N-diethylaminophenyl)vinyl)cyclo hex-2-ethylidene]-1-propenyl}-5-methyl-5-(4-cyclohexylphenyl)-2, 5-dihydrofuran is prepared as a solution of an organic electro-optic material (non-linear optical material) (hereinafter referred to as PSI solution). To 10 g of the PSI solution, 0.02 g of 18-crown-6-ether is added thereby making a PSI-E solution.

The PSI-E solution is applied onto a quartz substrate, heated at 120° C. thereby making a sample. The refractive index of the sample is measured by a prism coupling method, and is found to be 1.65.

Subsequently, a lower cladding layer made of an UV curable acrylic resin having a refractive index of 1.54 is applied onto a lower electrode made of a gold-sputtered silicon substrate, and the coating is irradiated with ultraviolet light thereby forming a cured resin film having a thickness of 3.5 µm.

Subsequently, the PSI-E solution is applied onto the lower cladding layer, and the coating is cured under heating thereby forming a waveguide layer having a thickness of 3.3 µm and a refractive index of 1.64. The waveguide layer is etched after photolithography, thereby patterning a Mach-Zehnder waveguide in ridge form. The waveguide has a thickness of 3.3 µm, and the ridge thereof has a height of 0.7 µm, and a width of 5 µm.

Subsequently, a UV curable resin is applied on the waveguide in the same manner as the lower cladding layer thereby forming an upper cladding layer having a thickness of 3.5 µm.

Subsequently, upper electrodes are formed by lift-off after photolithography on the upper cladding layer in such a manner that they overlie the two arms of the Mach-Zehnder waveguide, and then poling treatment is carried out. Chips are cut from the wafer by dicing, and thus a Mach-Zehnder waveguide device having an EO effect is fabricated.

Figure 4:
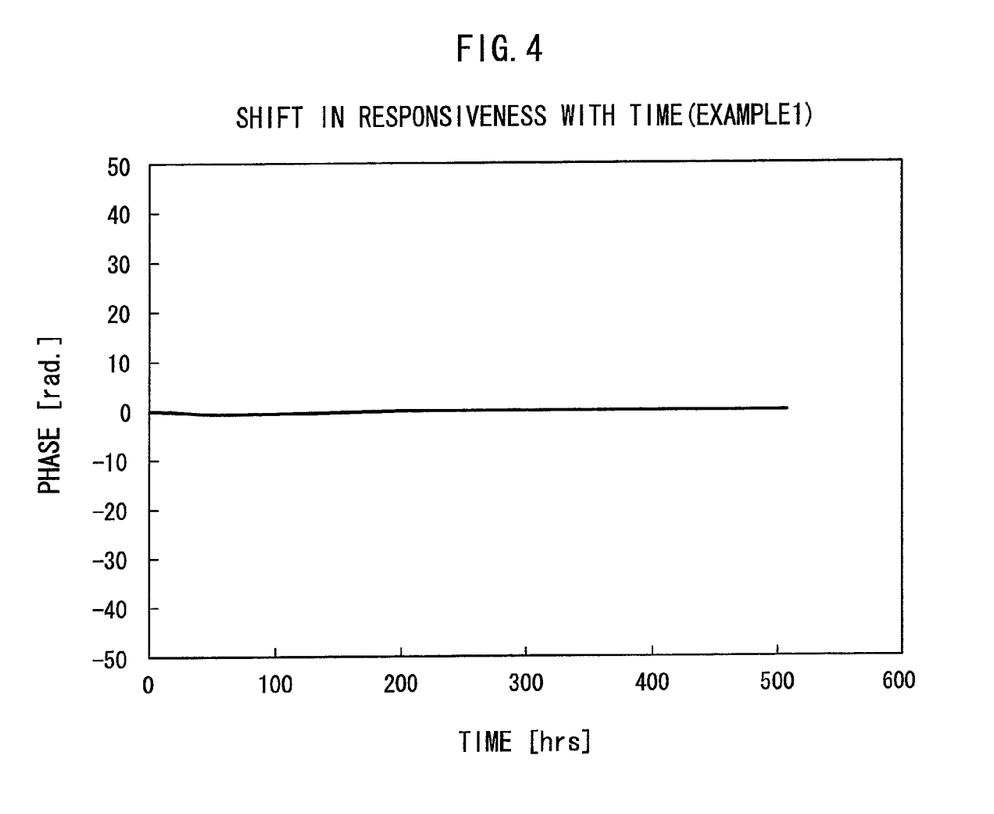
FIG. 4 is a graph showing the shift in the response characteristics with time (phase shift) of the waveguide device fabricated in Example 1.

An alternating voltage (conditions: −20 V to +20 V, 10 Hz) is applied to one of the upper electrodes of the Mach-Zehnder waveguide device thereby applying an alternating electric field to the device, and the shift in the response characteristics with time (phase shift in rad) is measured. The result is shown in FIG. 4. As is evident from FIG. 4, the operating point scarcely shifts during the measurement over 500 hours, which indicates that drift phenomenon was suppressed.

Although a ligand compound is doped into the waveguide in this example, the drift phenomenon may be suppressed similarly when a ligand compound is doped into at least one of the first cladding layer, the waveguide, and the second cladding layer.

Comparative Example 1

A waveguide device is fabricated in the same manner as Example 1, except that the waveguide is formed using the PSI solution. The PSI solution is applied onto a quartz substrate, and heated at 120° C. thereby making a sample. The refractive index of the sample is measured by a prism coupling method, and is found to be 1.66.

Figure 5:
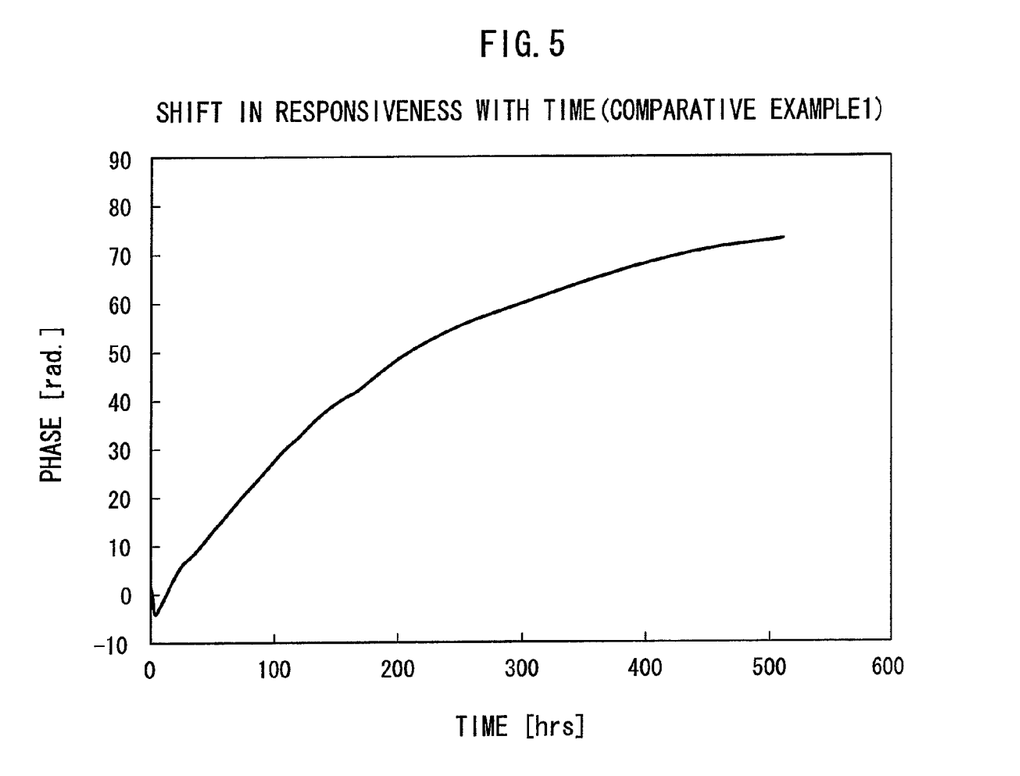
FIG. 5 is a graph showing the shift in the response characteristics with time (phase shift) of the waveguide device fabricated in Comparative Example 1.

An alternating voltage (conditions: −20 V to +20 V, 10 Hz) is applied to one of the upper electrodes of the Mach-Zehnder waveguide device thereby applying an alternating electric field to the device, and the shift in the response characteristics with time (phase shift in rad) is measured. The result is shown in FIG. 5. As is evident from FIG. 5, different from Example 1, the operating point significantly shifts in a short time during the measurement over 500 hours.

FIG. 6 is a schematic cross sectional view showing a waveguide device according to an alternative exemplary embodiment. A waveguide device 300 according to the exemplary embodiment is composed of stacked layers as shown in FIG. 6, wherein a lower electrode 302 (first electrode), a lower cladding layer 303 (first cladding layer), a waveguide 304, an upper cladding layer 305 (second cladding layer), and an upper electrode 306 (second electrode) are sequentially stacked on a substrate 301. The waveguide 304 is an inversed ridge waveguide.

FIG. 7 is a schematic cross sectional view showing a waveguide device according to an another alternative exemplary embodiment. A waveguide device 400 according to the exemplary embodiment is composed of stacked layers as shown in FIG. 7, wherein a lower electrode 402 (first electrode), a lower cladding layer 403 (first cladding layer), a waveguide 404, an upper cladding layer 405 (second cladding layer), and an upper electrode 406 (second electrode) are sequentially stacked on a substrate 401. The waveguide 404 is a twin ridge waveguide (a waveguide having projections on both sides in the thickness direction).

What is claimed is:

1. A waveguide device comprising:
a substrate; and
a first electrode, a first cladding layer, a waveguide, a second cladding layer, and a second electrode sequentially provided on the substrate,
wherein at least one of the first cladding layer, the waveguide, and the second cladding layer comprises a ligand compound which is capable of coordinating to a metal or metal ion,
wherein the ligand compound is a bidentate or higher-dentate ligand compound,
wherein the waveguide has a substantially uniform index of refraction, and
wherein the waveguide is a ridge waveguide, an inversed ridge waveguide, or a twin ridge waveguide.

2. The waveguide device according to claim 1, wherein the ligand compound is an inclusion compound.

3. The waveguide device according to claim 2, wherein the inclusion compound is a compound having a cyclic polyether structure.

4. The waveguide device of according to claim 3, wherein the compound having a cyclic polyether structure is a crown ether.

5. The waveguide device according to claim 1, wherein the ligand compound is a polymer compound having a ligand structure in a main chain or side chain thereof.

6. The waveguide device according to claim 1, wherein the ligand compound is included in the waveguide.

7. The waveguide device according to claim 1, wherein the ligand compound is included in the first cladding layer or the second cladding layer.

8. The waveguide device according to claim 1,
wherein at least one of the first cladding layer, the waveguide, and the second cladding layer is a first material comprising the ligand compound, and
wherein the ligand compound is present in a total amount between 0.001% to 10% by weight, with respect to a total solid content of the first material.

9. The waveguide device according to claim 1,
wherein at least one of the first cladding layer, the waveguide, and the second cladding layer is a first material comprising the ligand compound, and
wherein the ligand compound is present in a total amount between 0.01% to 3% by weight, with respect to a total solid content of the first material.

10. The waveguide device according to claim 1, wherein the waveguide has a ridge, and the ridge of the waveguide is provided at a surface of the waveguide that faces the second electrode, a cross-sectional area of the ridge is aligned with and equals a cross-sectional area of the second electrode when viewed from above the waveguide device, and the cross-sectional area of the ridge has the same shape as the cross-sectional area of the second electrode.

* * * * *